United States Patent

[11] 3,589,651

| [72] | Inventors | Ignatius John Niemkiewicz<br>Wilmington, Del.;<br>Oscar Simeon Willey, Jr., Glen Mills;<br>Arthur Constantine Condodina, King<br>Prussia, both of, Pa. |
|---|---|---|
| [21] | Appl. No. | 831,445 |
| [22] | Filed | June 9, 1969 |
| [45] | Patented | June 29, 1971 |
| [73] | Assignee | Gulf & Western Industrial Products Company |

[54] AIRCRAFT ARRESTING DEVICE
22 Claims, 7 Drawing Figs.

[52] U.S. Cl. ................................................ 244/110 A, 242/149
[51] Int. Cl. .................................................. B64f 1/00
[50] Field of Search ........................................... 244/110; 242/149, 151, 156, 75.2

[56] References Cited
UNITED STATES PATENTS

| 1,763,594 | 6/1930 | Nelson | 242/151 |
| 2,329,374 | 9/1943 | Holden | 242/151 |
| 2,637,511 | 5/1953 | Heijnis | 242/149 |
| 2,646,941 | 7/1953 | Borges, Jr. | 242/151 X |
| 2,686,018 | 8/1954 | Courtney | 242/151 |
| 2,686,639 | 8/1954 | Campbell | 242/149 X |
| 3,026,064 | 3/1962 | Goodwin | 242/156 |
| 3,123,325 | 3/1964 | Stephens | 244/110 |
| 3,172,625 | 3/1965 | Doolittle | 244/110 |
| 3,392,933 | 7/1968 | Singh | 242/149 |

Primary Examiner—Milton Buchler
Assistant Examiner—Paul E. Sauberer
Attorney—Meyer, Tilberry & Body ABSTRACT: An aircraft arresting device includes a rotatable reel having drive means for rotating said reel to wind an elongated flat tape thereon in layer-by-layer convolutions. Drag means is provided in spaced relation to the reel for applying a dragging force to the tape during rewind thereof so that the tape is placed in tension between the reel and the drag means. This winds the tape tightly on the reel and prevents slippage between adjacent tape layers during arrestment of an aircraft.

PATENTED JUN29 1971

INVENTORS
IGNATIUS JOHN NIEMKIEWICZ
OSCAR SIMEON WILLEY JR.
ARTHUR CONSTANTINE CONDODINA
BY
*Meyer, Tilberry & Body*
ATTORNEYS.

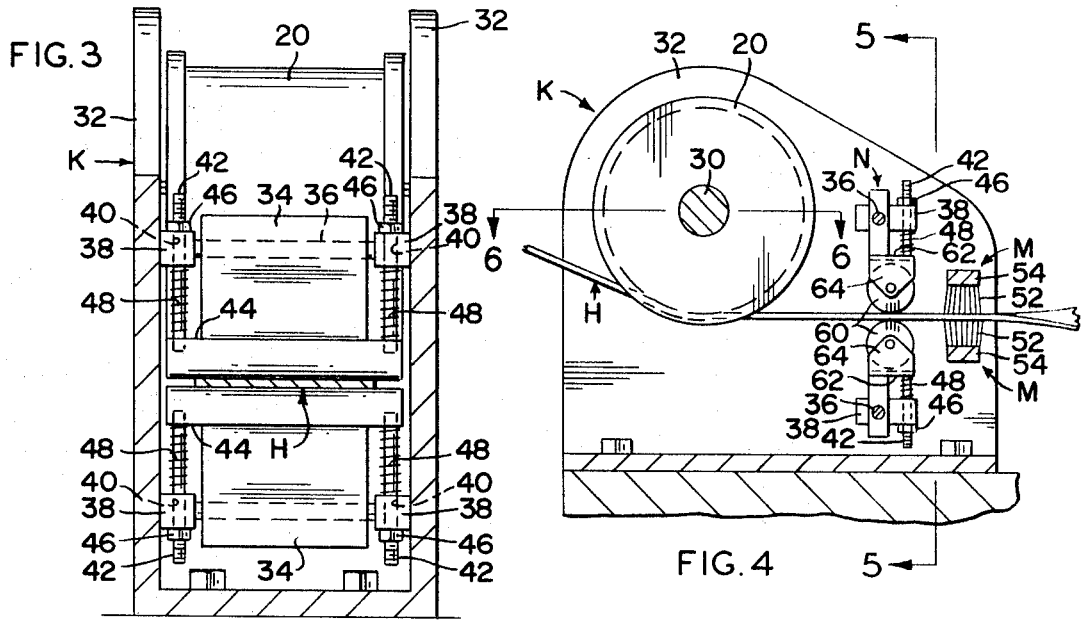
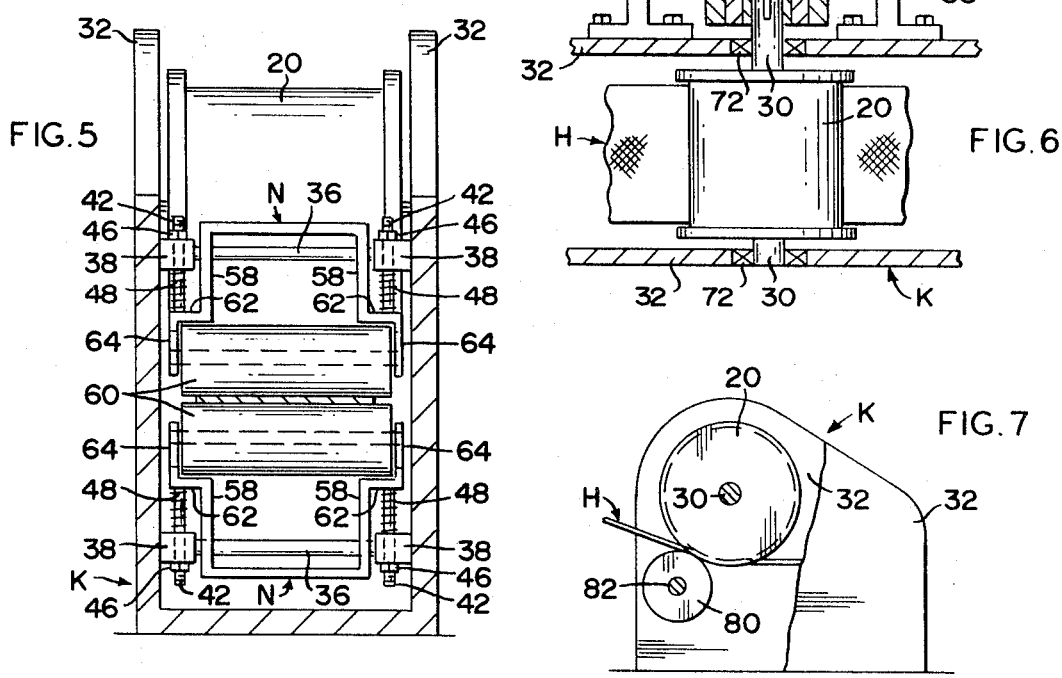

3,589,651

AIRCRAFT ARRESTING DEVICE

BACKGROUND OF THE INVENTION

This application pertains to the art of aircraft arresting gear and more particularly to aircraft arresting gear of the type which includes a rotatable reel having an elongated flat tape wound thereon in layer-by-layer convolutions. The invention is particularly applicable to aircraft arresting devices and will be described with particular reference thereto although it will be appreciated that the invention has broader applications and can be used in devices for arresting movement of other bodies.

One known type of aircraft arresting apparatus includes a rotatable reel having drive means for rotating the reel to coil an elongated flat tape thereon in layer-by-layer convolutions. Such devices are described in U.S. Pat. Nos. 25,406; 3,142,458; and 3,220,216 to Byrne et al.

In devices of the type described, the tape is placed in tension during arrestment of an aircraft and causes the reel to rotate. Rotation of the reel is retarded by a braking means in order to brake an aircraft to a stop. The layers of tape on the reel are subjected to a very high centrifugal force during high speed rotation of the reel when an aircraft is arrested. This centrifugal force tends to separate certain adjacent tape layers from one another and create a void. In addition, the only force resisting relative slippage between adjacent tape layers to tighten the tape layers on the reel during an arrestment, is a frictional force between the faces of adjacent tape layers. When slippage between adjacent tape layers occurs during arrestment of an aircraft, the tension in the tape momentarily drops off very sharply. Once the slippage has stopped, a severe impact load is imparted to the aircraft, the tape and the reel. Such impact loads are highly destructive and it would be desirable to prevent them. It would be desirable to wind a tape upon a reel in such a manner that slippage between adjacent layers would not occur during arrestment of an aircraft.

SUMMARY OF THE INVENTION

In accordance with the present invention, an aircraft arresting apparatus includes a rotatable reel having drive means for rotating the reel to coil an elongated flat tape thereon in layer-by-layer convolutions. In rewinding the tape on the reel, a dragging force is applied to the tape at a position spaced from the reel. The dragging force places the tape in tension between the reel and the position at which the dragging force is applied so that the tape layers wound upon the reel are under compression. The compressive force between adjacent tape layers greatly increases the frictional force retarding slippage between adjacent tape layers. In addition, having the tape wound upon the reel under tension so that the layers are in compression overcomes separation of adjacent tape layers by centrifugal force during high speed rotation of the reel.

In one arrangement, the dragging force is applied to at least one face of the tape by either a roller or a friction shoe. In accordance with another aspect of the invention, brushing means is provided for removing dirt from the one face prior to application of a dragging force thereto by the dragging means. In a preferred arrangement, the tape is squeezed between first and second drag force applying means which engage the opposite flat faces of the tape. One or both of the first and second drag force applying means may be defined by rotatable rollers. In accordance with another arrangement, the dragging force is applied by a rotatable roller having its own braking means for retarding rotation thereof.

It is a principal object of the present invention to coil an elongated flat tape upon a rotatable reel in an aircraft arresting apparatus in such a manner that slippage between adjacent tape layers on the reel is prevented during arrestment of an aircraft.

It is an additional object of the present invention to provide an improved method for rewinding an elongated flat tape upon a rotatable reel of an aircraft arresting apparatus in layer-by-layer convolutions so that adjacent tape layers on the reel will not slip relative to one another during arrestment of an aircraft.

It is also an object of the present invention to prevent slippage between adjacent layers of an elongated flat tape coiled upon a reel during arrestment of an aircraft by applying a dragging force to the tape during winding thereof upon a reel so that the tape layers upon the reel are under tension and compression.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 3 is an elevational view looking in the direction of arrows 3-3 of FIG. 2;

FIG. 4 is an elevational, cross-sectional view looking in the direction of arrows 2-2 of FIG. 1 and showing another embodiment of the present invention;

FIG. 5 is a view looking in the direction of arrows 5-5 of FIG. 4;

FIG. 6 is a cross-sectional view looking in the direction of arrows 6-6 of FIG. 4 and showing another embodiment of the present invention; and FIG. 7 is an elevational, cross-sectional view looking in the direction of arrows 2-2 of FIG. 1 and showing the position of another roller for use in the embodiment of FIG. 6.

DESCRIPTION OF THE PREFERRED EMBODIMENTS

Figure 1:
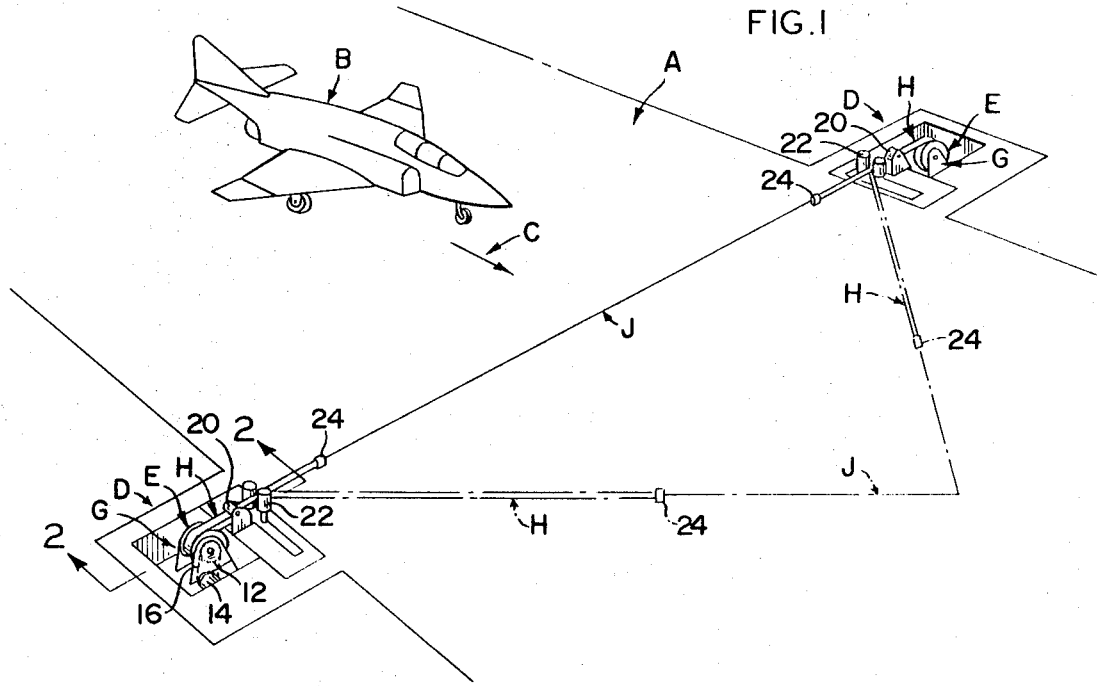
FIG. 1 is a diagrammatic illustration of an aircraft arresting apparatus installed adjacent a runway and having the present invention incorporated therein.

Referring now to the drawings, wherein the showings are for purposes of illustrating the preferred embodiments of the invention only and not for purposes of limiting same, FIG. 1 shows an aircraft runway A on which an aircraft B is adapted to land and travel in the direction of arrow C. Runway A is elongated in the direction of arrow C.

Energy absorbing aircraft arresting apparatus D is installed on opposite sides of runway A. Arresting apparatus D includes rotatable reels E rotatably mounted on supports G. Reels E include drive sprockets 12 connected with a suitable drive motor 14, such as an electric motor, internal combustion engine, or a turbine, by drive chain means 16. A one-way clutch is preferably included between motor 14 and drive chain 16 so that motor 14 is not rotated during arrestment of an aircraft. Such arrangements are well known and disclosed in detail in the aforementioned Byrne patents. Coiled upon reels E in layer-by-layer convolutions are elongated flat tapes H of the type described in the aforementioned Byrne patents. Tapes H extend beneath a horizontal rotatable sheave 20 and then between vertical sheaves 22 to points of connection 24 with a steel cable pendant J. An aircraft B landing on runway A engages pendant J and tensions tapes H to cause rotation of reels E which are braked by suitable brake such as those disclosed in the aforementioned Byrne patents. Tapes H and pendant J moves to the dashed line position in FIG. 1 during arrestment of an aircraft B. It will be understood that pendant J and tapes H move far down runway A as far as 1,000 feet or more before aircraft B is brought to a halt. Once aircraft B is brought to a halt, it is necessary to rewind tapes H back onto reels E to stretch pendant J across runway A for arrestment of another aircraft. In order to prevent slippage between adjacent layers of tape wound upon reels E during arrestment of an aircraft, it is desirable to rewind tapes H upon reels E under tension so that the layers of tape upon reels E will be under tension and compression. The compressive force increases the normal force acting between adjacent faces of adjacent tape layers and greatly increases the frictional resistance against slippage between adjacent tape layers. In addition, the tension and compression forces in the layers of tape on reels E prevents formation of voids between adjacent tape layers due to centrifugal force acting upon the tape layers during high speed rotation of reels E. In prior arrangements, a dead load, such as a wheeled vehicle, was attached to pendant J during rewinding of tapes H onto reels E. The retarding force of the dead load placed tension upon tapes H during rewind thereof so that the tape layers on reels E were under compression and tension. However, rapid cycling of an arresting apparatus is not possible when it is necessary to attach and remove a dead load on pendant J during rewind of tapes H. It is desirable to begin rewinding tapes H immediately after an aircraft B has been brought to a halt so that arresting apparatus D can be put in a condition for arresting a second aircraft as soon as possible.

In accordance with the present invention, tape H extends from reel E beneath rotatable sheave 20 which is journaled on shaft 30 mounted in spaced-apart supports 32 of support K. Frictional brake shoes 34 are pivotally mounted on shafts 36 affixed to brackets 38 which may be welded to the inner faces of supports 32. Brackets 38 have bores 40 therethrough through which rods 42 slidably extend. The bottom ends of rods 42 engage a shoulder surface 44 of friction shoes 34. The upper ends of rods 42 may be threaded for receiving nut 46. A coil spring 48 is positioned around rods 42 and biases against shoulders 44 and the bottom surface of brackets 38. With this arrangement, springs 48 bias upper friction shoe 34 clockwise about shaft 36, and biases bottom friction shoe 34 counterclockwise about its shaft 36. This yieldingly squeezes tape H between friction shoes 34. Nut 46 on rod 42 may be adjusted to stop pivotal movement of shoes 34 at a predetermined position in which tape H is not gripped too tightly to prevent sliding longitudinal movement thereof between friction shoes 34. If desired, it is possible to connect the bottom end portion of rods 42 to shoulder surface 44 of friction shoes 34 by swivel connection. With the arrangement described, rewinding of tape H on reel E causes friction shoes 34 to frictionally drag against the opposite flat faces of tape H to place tape H in tension between reel E and friction shoes 34. Thus, tape H is under tension as it is rewound upon reel E and the layers of tape on reel E will be under compression and tension so that slippage thereof during arrestment of an aircraft is prevented. In accordance with the further aspect of the invention, brushes M having bristles 52 affixed to brush back 54 are positioned between supports 32 with bristles 52 engaging across the full width of the opposite faces of tape H. Brush backs 54 may be bolted or otherwise secured to supports 32. It will be noted that brushes M are positioned forwardly of friction shoes 34 so that during rewinding of tape H on reel E, brushes M remove dirt from the flat surfaces of tape H to prevent undue abrasion and scoring of tape H by friction shoes 34. Without brushes M, the surface of tape H would come under much stronger abrasion by friction shoes 34 due to particles of dirt clinging to the flat surfaces of tape H.

Figure 2:
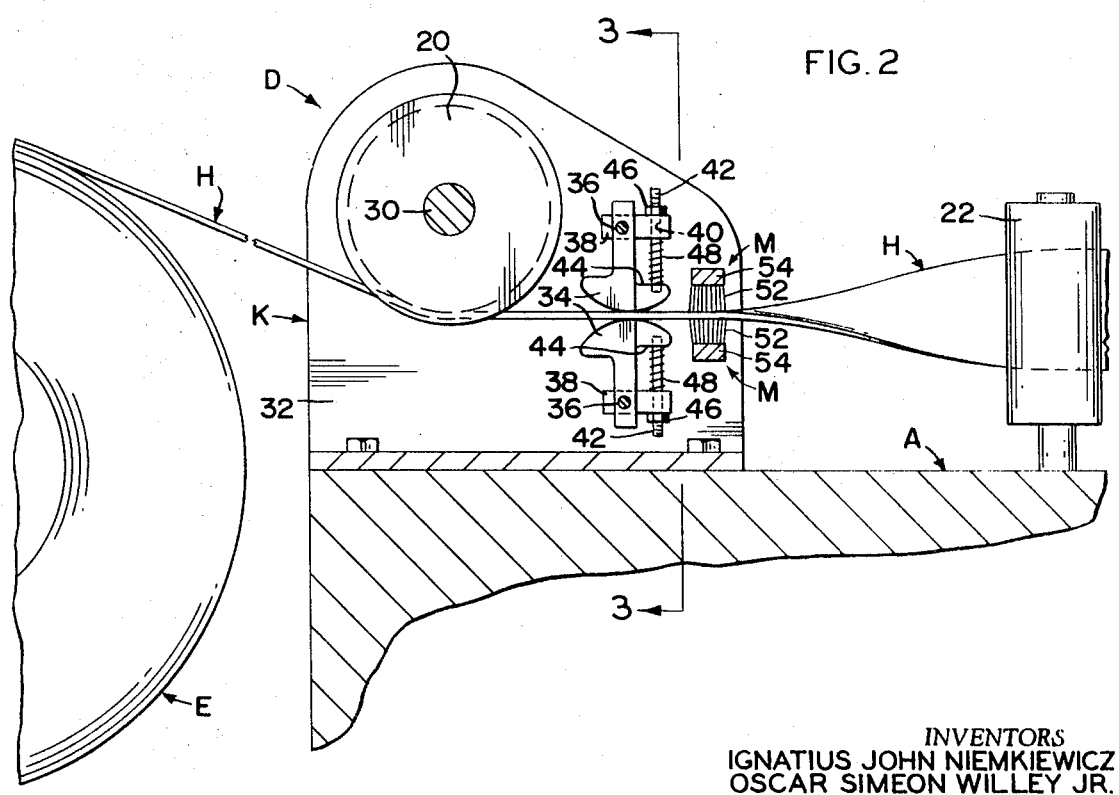
FIG. 2 is an elevational, cross-sectional view looking in the direction of arrows 2-2 of FIG. 1.

In accordance with another arrangement, friction shoes 34 of FIG. 2 are replaced by rotatable rollers 60 of FIG. 4. A bifurcated bracket member N is pivotally mounted on shaft 36 extending between brackets 38 welded to supports 32. Bifurcated bracket N includes spaced-apart arms 58 which are bent outwardly to provide shoulders 62 against which the bottom portions of springs 48 act to pivot bracket N about shaft 36. Bracket arms 58 are then formed downwardly to provide arm portion 64 on which shaft 66 is secured for rotatably mounting roller 60. Rollers 60 are yieldingly biased toward one another to squeeze tape H there between to retard longitudinal movement of tape H during rewind thereof on reel E. With the arrangement of FIG. 4, abrasion and high heat of frictional shoes 34 of FIG. 2 is avoided. It will be recognized that rollers 60 place tape H in tension between reel E and rollers 60 by compression so that tape H is tightly wound upon reel E.

In accordance with another arrangement, sheave 20 of FIGS. 1 and 2 may be connected with an overrunning clutch and brake as shown in FIG. 6. Shaft 30 of roller 20 is rotatably journaled in bearing 72 in supports 32. Roller 20 is then nonrotatably fixed to shaft 30. One end portion of shaft 30 extends through support 32 for connection with an overrunning clutch P. Overrunning clutch P includes a first portion 74 affixed on shaft 30 and a second outer portion 76 affixed to a brake disc 78. As shown in FIG. 7, a secondary roller 80 may be rotatably mounted on a shaft 82 between supports 32 in slightly spaced relation to roller 20 so that tape H is in firm engagement with the surface of roller 20. Longitudinal movement of tape H will then cause rotation of roller 20. A brake housing R is bolted or welded to the outer surface of support 32 and includes a channel-shaped portion 86 on which spring biased brakeshoes 88 are mounted. Brakeshoes 88 are spring biased toward one another and into engagement with brake disc 78. During arrestment of an aircraft, tape H is uncoiled from reel E and causes counterclockwise rotation of roller 20 as viewed in FIG. 7. Counterclockwise rotation of roller 20 causes clutch P to overrun so that there is no driving engagement from clutch part 74 to clutch part 76. However, during rewind of tape H on reel E, roller 20 is rotated clockwise and portions 74 and 76 of overrunning clutch P are engaged to rotate brake discs 78 against the frictional retarding force provided by spring biased brakeshoes 88. Therefore, tape H is placed in tension between brake roller 20 and reel E during rewind of tape H on reel E.

It will be recognized by those skilled in the art that in addition to having friction shoes 34 or rollers 60 yieldingly biased against flat surfaces of tape H, nuts 46 also provide adjustment of the maximum normal force with which shoes 34 or rollers 60 engage the flat surfaces of tape H. It should also be recognized that it is possible to adjust the springs used to bias brakeshoes 88 against brake discs 78 so that the proper tension may be placed in tape H between reel E and the drag means so that tape H will be wound upon reel E under proper tension and compression forces.

With the present invention, it is important to note that it is not necessary to manually set and reset any drag device to provide proper tension in tape H during rewinding thereof. The arrangement of the present invention is completely automatic in operation and provides no interference with withdrawal of tape H from reels E during arrestment of an aircraft. At the same time, the drag means of the present invention is automatically in position to provide the proper tension in tape H during rewind immediately following complete arrestment of an aircraft. Therefore, very rapid recycling of the arresting apparatus is possible so that the apparatus is repositioned in a proper condition for arresting an aircraft in an extremely short time after arrestment of an earlier aircraft.

It will be recognized that the improvement of the present invention may be used with reels rotatable about vertical, sloping, or horizontal axis if so desired.

While the invention has been described with reference to a preferred embodiment, it is obvious that modifications and alterations will occur to others upon the reading and understanding of this specification.

We claim:

1. In an aircraft arresting device including a rotatable reel having an elongated flat tape including a pair of opposite flat faces connected thereto and drive means for rotating said reel to coil said tape thereon in layer-by-layer convolutions, the improvement comprising; drag means positioned in spaced relation to said reel, said drag means engaging at least one flat face of said tape and imposing a frictional dragging force on said tape to retard longitudinal movement thereof when said tape is being wound upon said reel, said tape being placed in tension between said reel and said drag means when said tape is being wound upon said reel so that each tape layer on said reel is under compression and tension.

2. The device of claim 1 and further including yieldable biasing means yieldably biasing said drag means into engagement with said flat face of said tape.

3. The device of claim 1 wherein said drag means comprises first drag force applying means mounted for movement toward and away from said one flat face of said tape, biasing means yieldably biasing said first drag force applying means into engagement with said one flat face of said tape and second drag force applying means engaging the other flat face of said tape, said tape being squeezed between said first and second drag force applying means.

4. The device of claim 3 wherein at least one of said first and second drag force applying means comprises rotatable roller means.

5. The device of claim 3 wherein said second drag force applying means yieldably engages said other flat face of said tape.

6. The device of claim 3 wherein said first and second drag force applying means comprise rotatable roller means.

7. The device of claim 6 wherein said second drag force applying means yieldably engages said other flat face of said tape.

8. The device of claim 1 and further including brushing means engaging said one face for removing dirt therefrom prior to engagement with said drag means.

9. The device of claim 1 wherein said drag means comprises rotatable roller means and further including brake means for retarding rotation of said roller means.

10. The device of claim 1 wherein said drag means comprises a pair of shoes mounted adjacent said pair of opposite flat faces of said tape, at least one of said shoes being pivotally mounted for pivotal swinging movement toward and away from the other of said shoes, and biasing means for yieldably biasing said one shoe toward said other shoe.

11. The device of claim 10 and further including stop means for limiting movement of said one shoe toward said other shoe, said stop means being adjustable for selectively varying the position at which said one shoe is stopped from movement toward said other shoe.

12. The device of claim 11 and further including brush means engaging said opposite flat faces of said tape adjacent said shoes, said brush means being positioned further from said reel than said shoes.

13. The device of claim 1 wherein said drag means comprises a pair of brackets mounted adjacent said pair of opposite flat faces of said tape, at least one of said brackets having rotatable roller means thereon and the other of said brackets having tape engaging means thereon, at least said one bracket being pivotally mounted for pivotal swinging movement of said roller means toward and away from said tape engaging means, and biasing means for yieldably biasing said one bracket to move said roller toward said engaging means.

14. The device of claim 13 and further including stop means for limiting pivotal movement of said one bracket to move said roller means toward said engaging means, said stop means being adjustable for selectively varying the position at which said roller means is stopped from movement toward said engaging means.

15. The device of claim 1 and further including adjustment means for adjusting said drag means to vary the drag force imposed on said tape.

16. The device of claim 15 wherein said drag means applies a predetermined drag force to said tape when said tape is being wound upon said reel and automatically applies a drag force less than said predetermined drag force when said tape is being unwound from said reel.

17. The device of claim 1 and further including guide sheave means positioned between said reel and said drag means for engaging and guiding said tape during coiling onto said reel.

18. The device of claim 17 and further including second guide sheave means positioned further from said reel than said drag means for engaging and guiding said tape through said drag means during coiling of said tape onto said reel.

19. The device of claim 1 and further including guide sheave means positioned further from said reel than said drag means for engaging and guiding said tape through said drag means during coiling of said tape onto said reel.

20. The device of claim 19 wherein said drag means applies a predetermined drag force to said tape when said tape is being wound upon said reel and automatically applies a drag force less than said predetermined drag force when said tape is being unwound from said reel.

21. A method of tightly winding an elongated flat tape having opposite flat faces in layer-by-layer convolutions onto a rotatable reel of an aircraft arresting device with the reel having drive means for rotating said reel to wind said tape thereon, comprising the step of; applying a frictional dragging force to said tape at a position spaced from said reel to retard longitudinal movement of said tape and to place said tape in tension between said reel and the position at which said dragging force is applied when said reel is rotated to coil said tape thereon so that each layer of tape coiled on said reel is under compression and tension.

22. The method of claim 21 wherein said dragging force is applied to at least one flat face of said tape and further including the step of brushing dirt from said tape prior to application of said dragging force.